US007211017B2

(12) United States Patent
Green et al.

(10) Patent No.: US 7,211,017 B2
(45) Date of Patent: May 1, 2007

(54) INTER-AXLE DIFFERENTIAL LOCK SHIFT MECHANISM

(75) Inventors: Michael Green, Kalamazoo, MI (US); Chris Pollack, Kalamazoo, MI (US); Gary A. Turner, Three Rivers, MI (US); Leo Wenstrup, Portage, MI (US); James F. Ziech, Kalamazoo, MI (US)

(73) Assignee: Dana Corporation, Toleda, OH (US)

( * ) Notice: Subject to any disclaimer, the term of this patent is extended or adjusted under 35 U.S.C. 154(b) by 27 days.

(21) Appl. No.: 10/835,663

(22) Filed: Apr. 30, 2004

(65) Prior Publication Data
US 2004/0204282 A1   Oct. 14, 2004

Related U.S. Application Data

(63) Continuation-in-part of application No. 10/288,686, filed on Nov. 6, 2002, now Pat. No. 6,918,851.

(30) Foreign Application Priority Data
Nov. 5, 2003   (CA) .................................... 2448307
Nov. 5, 2003   (MX) .................... PA/a/2003/010092

(51) Int. Cl.
*F16H 48/20*  (2006.01)

(52) U.S. Cl. .................. 475/86; 192/85 A; 192/85 CA (58) Field of Classification Search .................. 475/84, 475/86, 243; 74/339; 192/85 A, 85 CA, 192/69.82, 69.83; 92/165 PR; 180/24.09, 180/248, 249, 70.12, 70.28
See application file for complete search history.

(56) References Cited

U.S. PATENT DOCUMENTS 2,132,692 A   10/1938  Lawrence
2,803,149 A *  8/1957  Pringle .......................... 475/86
3,146,842 A   9/1964  Nelson et al.
3,460,404 A   8/1969  Schmid
3,744,606 A *  7/1973  Bucksch .................. 192/87.11
3,915,032 A   10/1975  Ottemann (Continued)

FOREIGN PATENT DOCUMENTS

EP        1 126 189 A1    8/2001

(Continued)

OTHER PUBLICATIONS

English Abstract of Japanese Patent No. 62 227822.

*Primary Examiner*—David D. Le
(74) *Attorney, Agent, or Firm*—Dykema Gossett PLLC (57) ABSTRACT

An improved inter-axle differential locking clutch is provided that aligns the actuator and the clutch member thereby reducing space and material requirements in the axle assembly housing. The clutch also eliminates the need for a pushrod and shift fork thereby reducing tooling and production costs, as well as eliminating issues associated with misalignment of the piston and pushrod, relative rotation of the shift fork and clutch member, and tipping of the shift fork. The clutch includes one or more pistons disposed within either the axle housing or a carrier supporting the input shaft bearing. Fluid pressure actuates the pistons against a clutch member causing selective engagement between the clutch member and either a side gear driven by the inter-axle differential or a differential case housing the differential gears of the inter-axle differential.

20 Claims, 11 Drawing Sheets

U.S. PATENT DOCUMENTS

| | | | |
|---|---|---|---|
| 3,916,278 A | 10/1975 | Currell et al. | |
| 4,037,696 A | 7/1977 | Shealy | |
| 4,042,080 A | 8/1977 | Nelson | |
| 4,050,534 A | 9/1977 | Nelson et al. | |
| 4,194,586 A | 3/1980 | Hicks | |
| 4,249,429 A * | 2/1981 | Denning | 475/241 |
| 4,263,824 A | 4/1981 | Mueller | |
| 4,432,431 A | 2/1984 | Russell | |
| 4,462,272 A * | 7/1984 | Roper | 475/240 |
| 4,548,306 A * | 10/1985 | Hartz | 192/70.28 |
| 4,582,160 A | 4/1986 | Weismann et al. | |
| 4,671,135 A | 6/1987 | Dangel | |
| 4,702,354 A * | 10/1987 | Ingram et al. | 188/196 D |
| 4,715,248 A | 12/1987 | Gant | |
| 4,733,578 A | 3/1988 | Glaze et al. | |
| 5,099,944 A | 3/1992 | Kageyama et al. | |
| 5,123,513 A | 6/1992 | Petrak | |
| 5,176,591 A | 1/1993 | Krisher | |
| 5,267,489 A | 12/1993 | Ziech | |
| 5,273,499 A | 12/1993 | Friedl et al. | |
| 5,299,986 A | 4/1994 | Fabris et al. | |
| 5,320,586 A | 6/1994 | Baxter, Jr. | |
| 5,353,890 A | 10/1994 | Clohessy | |
| 5,370,018 A | 12/1994 | Kwasniewski | |
| 5,386,898 A | 2/1995 | Weilant et al. | |
| 5,503,602 A | 4/1996 | Dick | |
| 5,591,098 A | 1/1997 | Jones et al. | |
| 5,687,824 A * | 11/1997 | Hara et al. | 192/85 CA |
| 5,860,889 A | 1/1999 | Schlosser et al. | |
| 5,890,989 A * | 4/1999 | Yamazaki et al. | 475/295 |
| 6,027,422 A * | 2/2000 | Yamazaki | 475/231 |
| 6,368,072 B1 | 4/2002 | Inoue et al. | |
| 6,422,128 B1 | 7/2002 | Ahn | |
| 6,425,840 B1 | 7/2002 | Johansson | |
| 6,464,053 B1 | 10/2002 | Hoebrechts | |
| 6,467,592 B1 | 10/2002 | Dernebo | |
| 6,540,634 B2 * | 4/2003 | Thompson | 475/86 |
| 6,543,596 B2 * | 4/2003 | Martin et al. | 192/85 AA |
| 6,546,841 B2 * | 4/2003 | Kato et al. | 92/71 |
| 6,648,788 B1 | 11/2003 | Sullivan | |
| 2003/0203783 A1 | 10/2003 | Sullivan | |
| 2004/0087408 A1 | 5/2004 | Ziech et al. | |
| 2004/0204282 A1 | 10/2004 | Green et al. | |

FOREIGN PATENT DOCUMENTS

| | | |
|---|---|---|
| FR | 2789739 A1 | 8/2000 |
| GB | 1 189 247 | 4/1970 |
| JP | 62 227822 | 10/1987 |
| JP | 06081903 A | 3/1994 |

* cited by examiner

INTER-AXLE DIFFERENTIAL LOCK SHIFT MECHANISM

This application claims priority to and is a continuation-in-part of U.S. patent application Ser. No. 10/288,686 filed Nov. 6, 2002, now U.S. Pat. No. 6,918,851, the entire disclosure of which is incorporate herein by reference.

BACKGROUND OF THE INVENTION

1. Field of the Invention

The present invention relates to an inter-axle differential, and more particularly, to an improved locking clutch for inter-axle differentials.

2. Discussion of Related Art

A conventional tandem axle assembly for heavy-duty trucks used in on-road and off-road service includes forward and rear axle assemblies and an intermediate drive shaft assembly connecting the two axle assemblies. The forward and rear axle assemblies each include a pair of axle half shafts extending therefrom on which one or more wheels of a vehicle are mounted. The axle half shafts in each axle assembly are driven by a wheel differential. The wheel differential includes a pinion gear in mesh with a ring gear (which in turn drives a plurality of bevel gears to cause rotation of the axle half shafts).

Tandem axle assemblies commonly employ an inter-axle differential to divide power between the forward and rear axle assemblies. The inter-axle differential enables speed differences between the drive axles, e.g., to allow torque balance between the drive axles during the vehicle cornering, to compensate for tire size differences, etc.

The inter-axle differential is generally housed within the forward axle assembly. The inter-axle differential for a conventional tandem axle assembly typically includes an input shaft extending into a housing of the forward axle assembly and a spider (or cross-member) mounted on the input shaft and supporting a plurality of bevel pinion gears. The inter-axle differential further includes a pair of side gears in mesh with, and driven by, the pinion bevel gears. One side gear is used to drive the pinion gear of the forward axle assembly wheel differential. The other side gear is coupled to an output shaft that extends outwardly from the forward axle assembly housing and drives the intermediate drive shaft assembly and, indirectly, the pinion gear of the rear axle assembly wheel differential.

At times, it may be necessary to lock the inter-axle differential. For example, during hazardous driving conditions it may be necessary to prevent power from being delivered to a wheel that has lost traction. In conventional inter-axle differentials, a locking clutch member is disposed about the input shaft and can be shifted into engagement with a second clutch member typically defined by one of the side gears to lock the inter-axle differential. Shifting of the locking clutch member is typically accomplished using a shift fork that is received within the clutch member and is moved through mechanical or electronic actuation. In particular, a piston may urge a pushrod against the shift fork.

Conventional locking clutches for inter-axle differentials have several drawbacks. First, the pushrod and piston are commonly located at a radial distance from the clutch members thereby consuming valuable space and material in the axle assembly housing. Second, tooling for the piston, pushrod and shift fork are relatively expensive, and production of these components is also relatively expensive. Third, relative rotation occurs between the shift fork and clutch member that causes wear on the shift fork. Fourth, the tendency to place the piston and pushrod bores in separate parts creates misalignment concerns. Finally, the offset load applied to the shift fork by the pushrod causes the shift fork to tip, increasing wear on the fork and clutch member and potentially resulting in binding of the clutch splines.

The inventors herein have recognized a need for a clutch for an inter-axle differential that will minimize and/or eliminate the above-identified deficiencies.

SUMMARY OF THE INVENTION

The present invention provides a clutch for an inter-axle differential. The clutch includes a clutch member disposed about an input shaft. The clutch member is configured to selectively engage a side gear driven by a plurality of differential gears. The clutch further includes a spring biasing the clutch member away from the side gear. The clutch further includes a carrier disposed within a housing of the inter-axle differential and supporting a bearing disposed between the carrier and the input shaft. The clutch also includes a piston disposed within a chamber in the carrier. This piston is configured for selective engagement with the clutch member to urge the clutch member into engagement with the side gear.

A clutch in accordance with the present invention is advantageous as compared to existing locking clutches for inter-axle differentials. The inventive clutch aligns the actuator and the clutch member thereby reducing space and material requirements in the axle assembly housing. The inventive clutch also eliminates the need for a pushrod and shift fork thereby reducing tooling and production costs, as well as eliminating the issues associated with misalignment of the piston and pushrod, relative rotation of the shift fork and clutch member, and tipping of the shift fork.

These and other features and objects of this invention will become apparent to one skilled in the art from the following detailed description and the accompanying drawings illustrating features of this invention by way of example.

DETAILED DESCRIPTION OF EMBODIMENTS OF THE INVENTION

Figure 1:
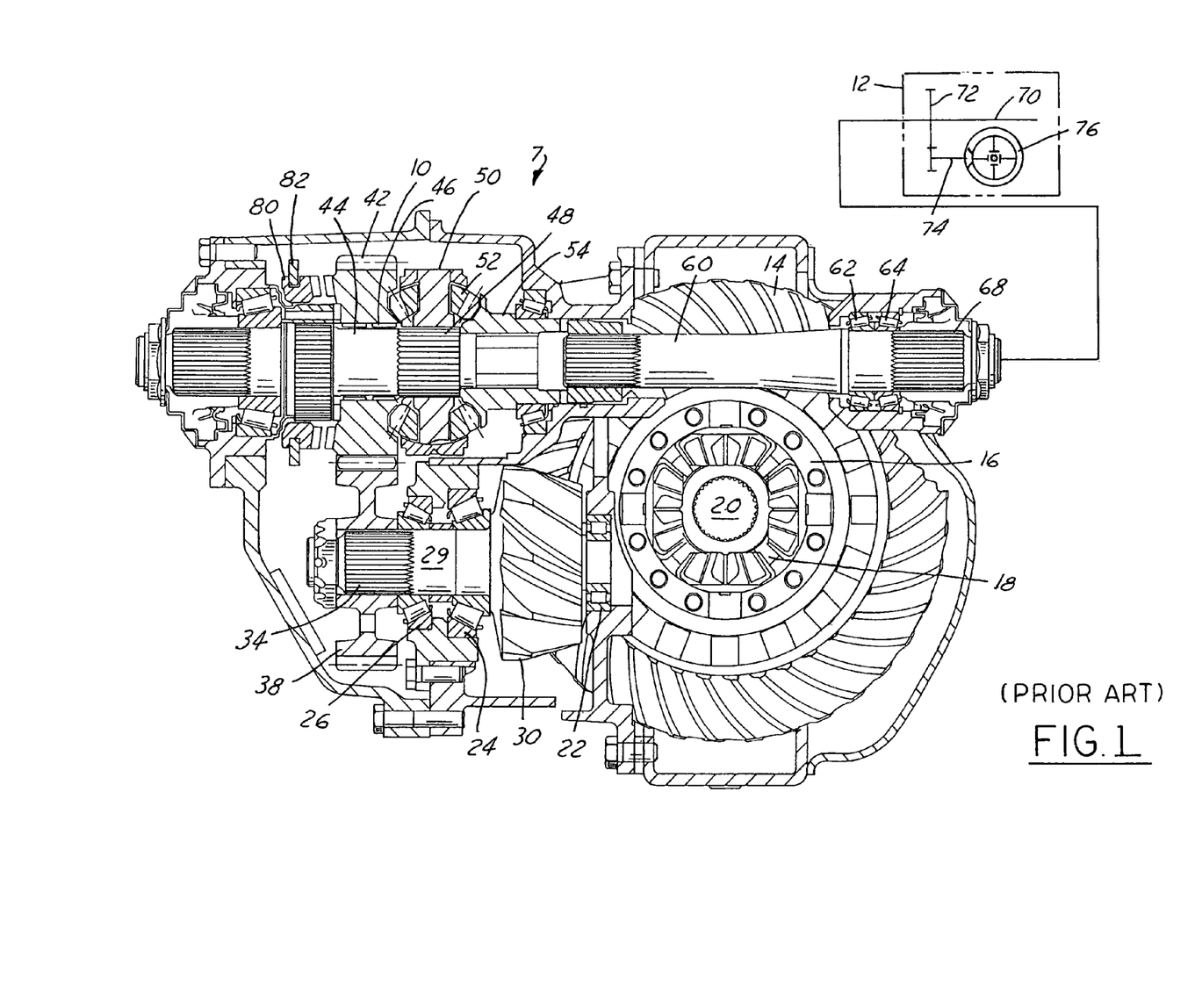
FIG. 1 is a view, mostly sectional, of a prior art arrangement of an axle assembly with an interaxle differential for a vehicle having at least first and second drive axles prior to the present invention.

Referring to FIG. 1 an arrangement 7 of an axle assembly with an interaxle differential for a vehicle having at least first and second drive axles is provided. The casing 10 for the front axle is shown in section and the casing for the rear axle 12 is shown schematically. The arrangement 7 has rotatably mounted therein for the front axle a ring gear 14. The ring gear 14 mounts a carrier 16. The carrier 16 along with side gears 18 (only one shown) forms a front axle differential for the half shafts (only one shown) 20 of the front axle. Rotatably mounted in the casing 10 by a front end bearing 22 and tapered thrust bearings 24, 26 is a counter shaft 29 with a pinion gear 30 along its end. The pinion gear 30 is meshed with the ring gear 14. On a second opposite end 34 of the counter shaft there is mounted by a splined connection driven gear 38. The driven gear 38 is meshed with a side gear 42. The example shown is a helical gear; however, gear 42 can be a spur or other parallel gear. The side gear 42 is rotatably mounted on a first or front axle input shaft 44 by a bearing 46. The side gear 42 is mounted adjacent a front end 48 of the front axle input shaft 44.

A spider 50 has a splined connection with the rear extreme end of the first axle input shaft 44. The spider 50 has bevel pinions 52 which are in a mesh relationship with the side gear 42. The bevel pinions 52 are also meshed with a rear bevel side gear 54. The side gear 54 is torsionally locked onto the second or rear axle input shaft 60. The second axle input shaft (sometimes referred to as the output shaft) 60 is mounted in its rear end in the casing 10 by thrust bearings 62, 64. A rear end 68 of the second axle input shaft 60 is connected via a yoke and a universal joint connected drive shaft (not shown) with a shaft 70 having a gear 72 which is in turn meshed with a pinion 74 which turns a ring gear 76 which drives the rear axle halves in a manner similar to that previously described for the front ring gear 14 and the front half shafts 20.

Axially slidably mounted on the front axle input shaft 44 is a sliding dog clutch gear 80. The clutch gear 80 is axially positioned on the front axle input shaft 44 by a fork 82. A mechanism (not shown) is provided for moving the fork while retaining the fork in a desired axial position with respect to the front axle input shaft 44. When it is desired to lock the front axle input shaft 44 with the rear axle input shaft 60, the fork 82 moves the clutch gear 80 rearward to lock in position with the side gear 42. The locking of the clutch gear 80 with the side gear 42 causes the clutch gear 80, side gear 42, spider 50, side gear 54 and rear axle output shaft 60 to rotate in unison and effectively eliminate the differential which typically exists between the front axle input shaft 44 and the rear axle output shaft 60.

Figure 2:
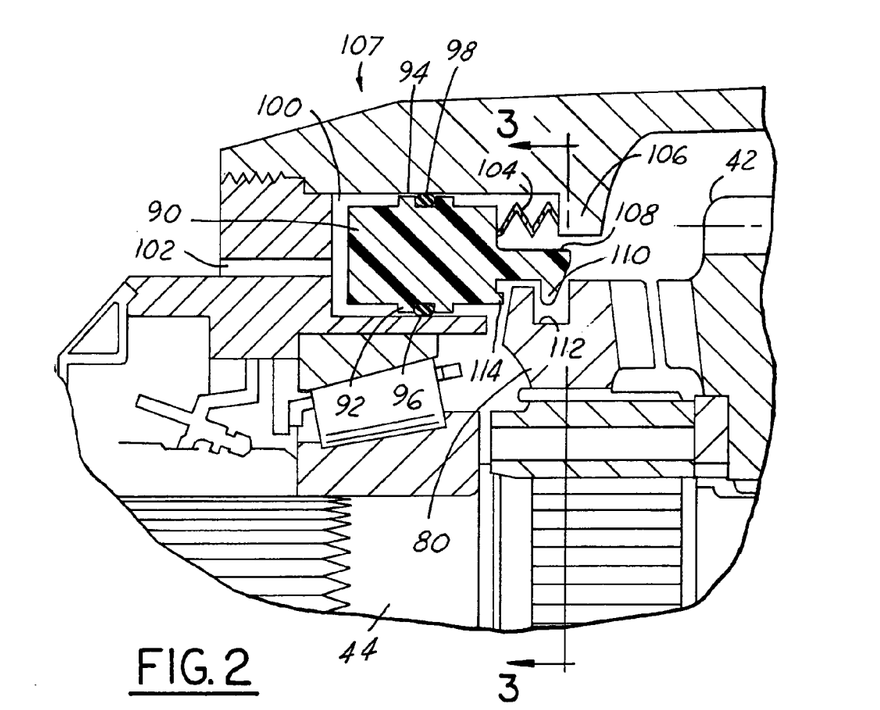
FIG. 2 is a partial sectional view of a preferred embodiment arrangement of an axle assembly with an interaxle differential for a vehicle having at least first and second drive axles according to the present invention.
Figure 3:
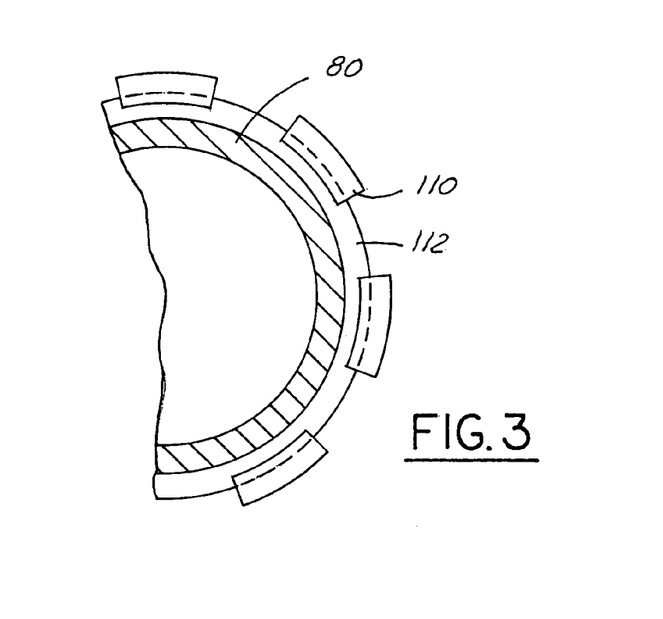
FIG. 3 is a view taking along lines 3—3 of FIG. 2.

Referring to FIGS. 2–3, an arrangement 107 of the present invention is provided. Items performing similar functions as those previously described will be given identical reference numerals. In the arrangement 107, front axle input shaft 44 has axially slidably mounted thereon a clutch gear 80. Replacing the fork 82 is a fluid-actuated annular piston 90. The piston 90 can be provided by various types of wear-resistant materials such as brass or a fiber-reinforced polymeric material such as glass reinforced plastic. The piston 90 has inter diameter studs 92, 94 which provide ring seats for sealing rings 96, 98 respectively. The sealing rings 96, 98 seal an annular chamber 100 that can be hydraulically or preferably pneumatically fed via a line 102.

A bevel spring 104 juxtaposed between a leg 106 of the casing and the piston 90 biases the piston 90 to its forward-most position. The piston 90 also has a series of geometrically spaced forward extending fingers 108 having a hook 110 which extend into a fork groove 112 of the clutch gear 80. To engage the clutch gear 80 with the side gear 42, the chamber 100 is pressurized and the piston 90 is actuated rearward causing a contact portion 114 to push the clutch gear 80 into engagement with the side gear 42. Upon depressurization of the chamber 100, the piston 90 will be pushed back by the bevel spring(s) 104 causing the hook 110 captured within the fork groove 112 to pull the clutch gear 80 out of engagement with the clutch groove. Typically the piston will be flexible enough so that upon initial assembly the hooks 110 will be forward of a forward end of the clutch gear and pressurization of the chamber 100 will cause the hook and fingers 108 to flex upwards and then snap down into position.

Figure 4:
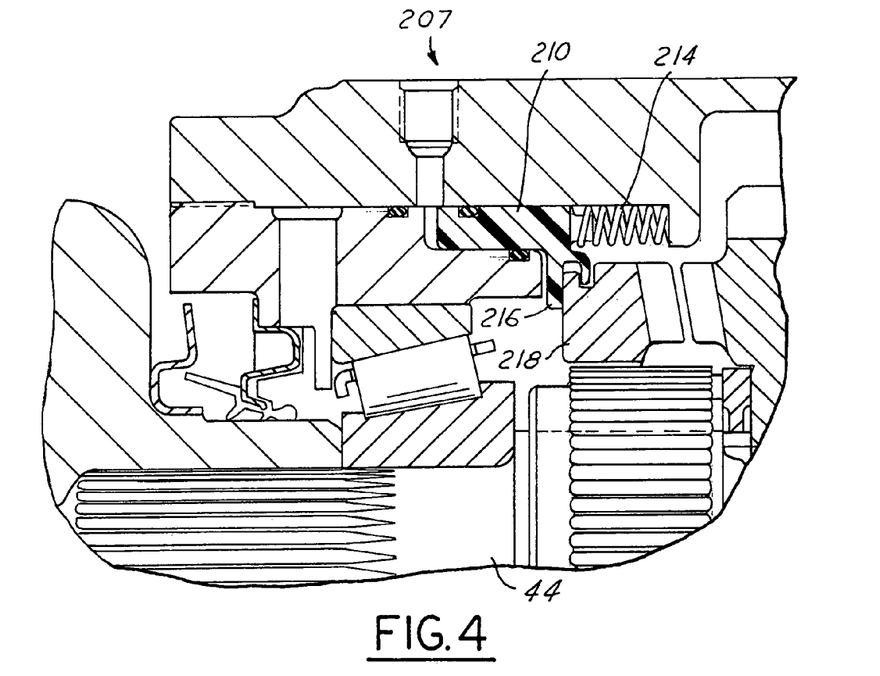
FIG. 4 is a view similar to that of FIG. 2 of an alternate preferred embodiment arrangement of an axle assembly with an interaxle differential for a vehicle having at least first and second drive axles.

Referring to FIG. 4, an interaxle differential arrangement 207 is provided having a front axle input shaft 44. The interaxle differential arrangement 207 has a clutch gear 218 similar to that as previously described. An annular piston 210 is provided which is biased to its forward position by a series of geometrically and equally spaced coil springs 214. The piston 210 has an inwardly extending arm 216 which abuts a forward face of the clutch gear 218.

Figure 5:
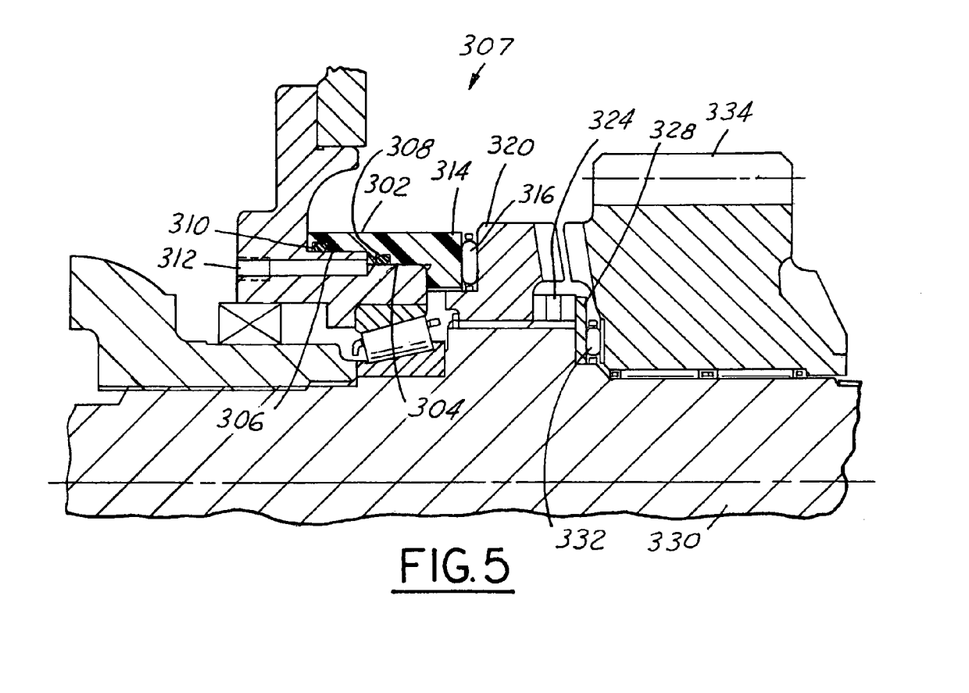
FIG. 5 is a sectional view similar to that of FIGS. 2 and 4 of another alternate preferred embodiment interaxle differential according to the present invention.

Referring to FIG. 5, an arrangement 307 interaxle differential is provided. The interaxle differential 307 has a piston 302. The piston 302 has multiple inter diameters 304, 306 which are sealed by O-rings 308, 310 respectively, that seal the expansion chamber upon pressurization of the same via a line 312. The piston 302 has a head 314 which abuts a needle bearing 316 which is juxtaposed between the piston 302 and the clutch gear 320. The clutch gear is spring biased forward to its non-actuated position by a wave spring 324. The wave spring 324 is juxtaposed between a plate 328 which is mounted on a first axle input shaft 330 and the clutch gear 320. A needle bearing 332 is juxtaposed between the plate 328 and a side gear 334.

Figure 6:
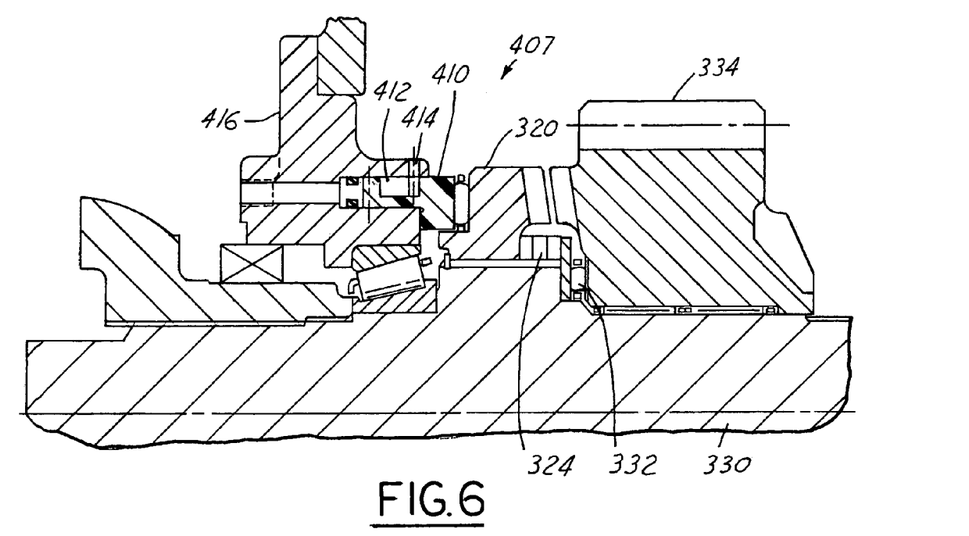
FIG. 6 is a sectional view similar to that of FIG. 5 of still another alternate preferred embodiment interaxle differential according to the present invention.

Referring to FIG. 6, an interaxle differential arrangement 407 is provided with items common to the arrangement 307 being given like reference numerals. In arrangement 407, a piston 410 is provided having a longitudinal non-angular slot 412. A pin 414 is projected through an aperture in the casing 416 having its lower end projecting into the slot 412 to provide a pin and slot anti-rotational arrangement. The pin and slot arrangement between the pin held within the casing 416 and also within the slot 412 prevents rotation of the piston 410.

Figure 7:
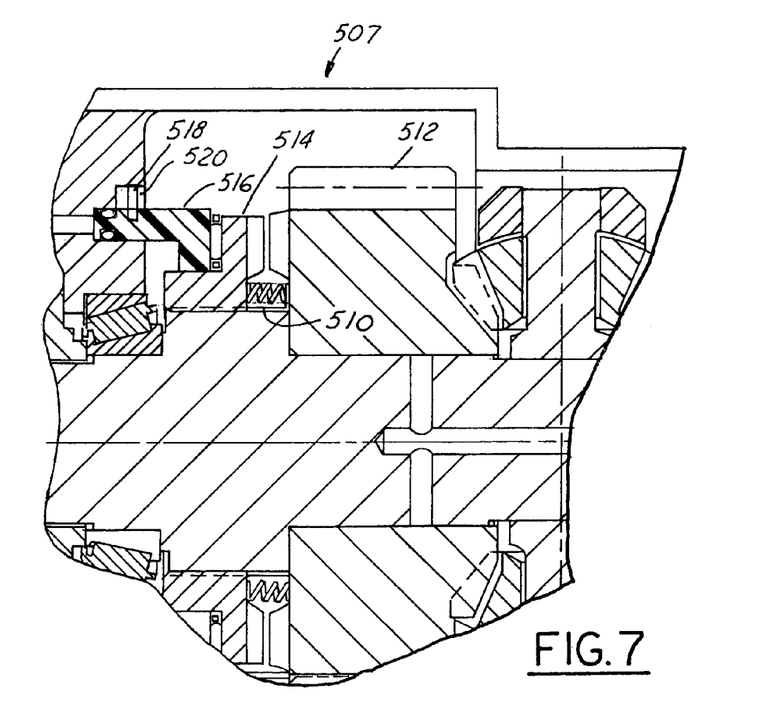
FIG. 7 is a sectional view similar to that of FIG. 6 of still another alternate preferred embodiment interaxle differential according to the present invention.
Figure 8:
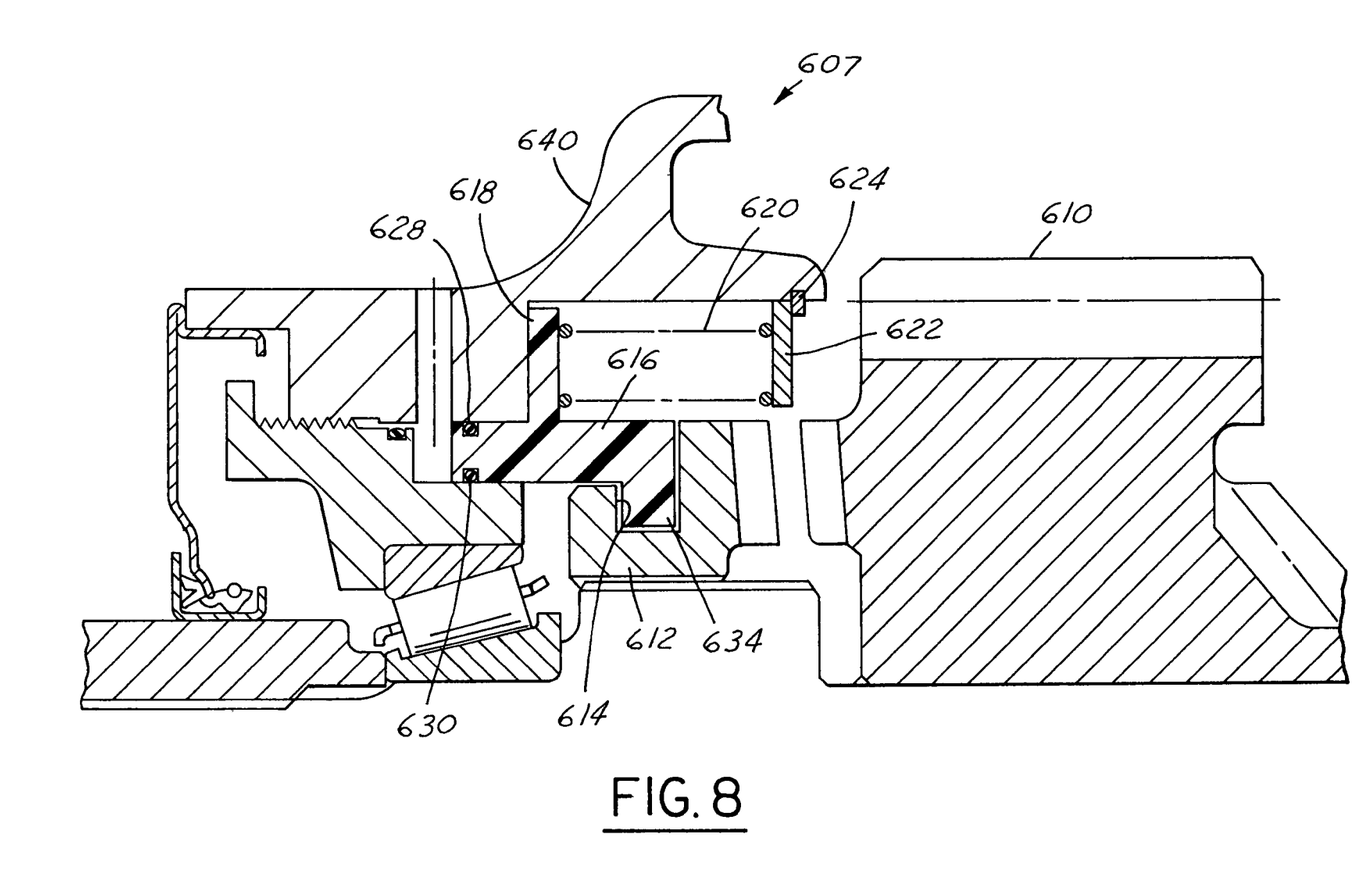
FIG. 8 is a sectional view similar to that of FIG. 7 of still another alternate preferred embodiment interaxle differential according to the present invention.
Figure 9:
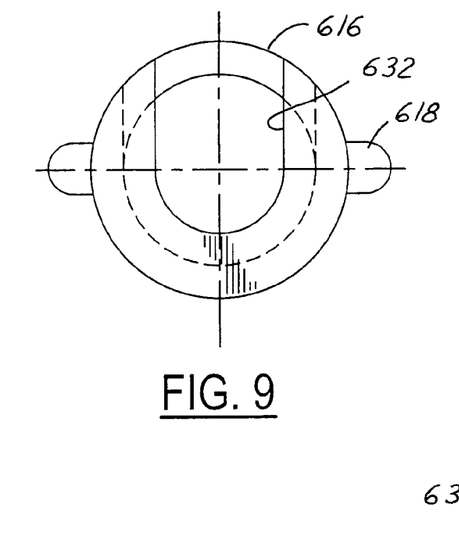
FIG. 9 is a plan elevational view of the piston of the interaxle differential show in FIG. 8.
Figure 10:
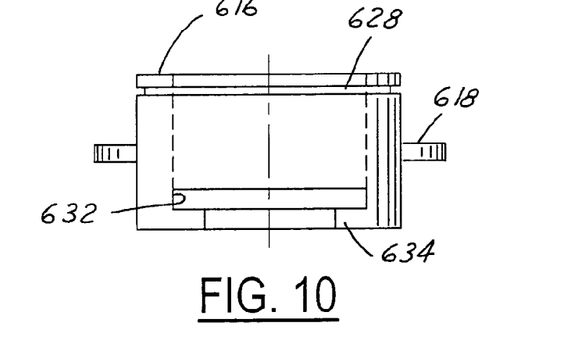
FIG. 10 is a side elevational view of the piston shown in FIG. 9.
Figure 11:
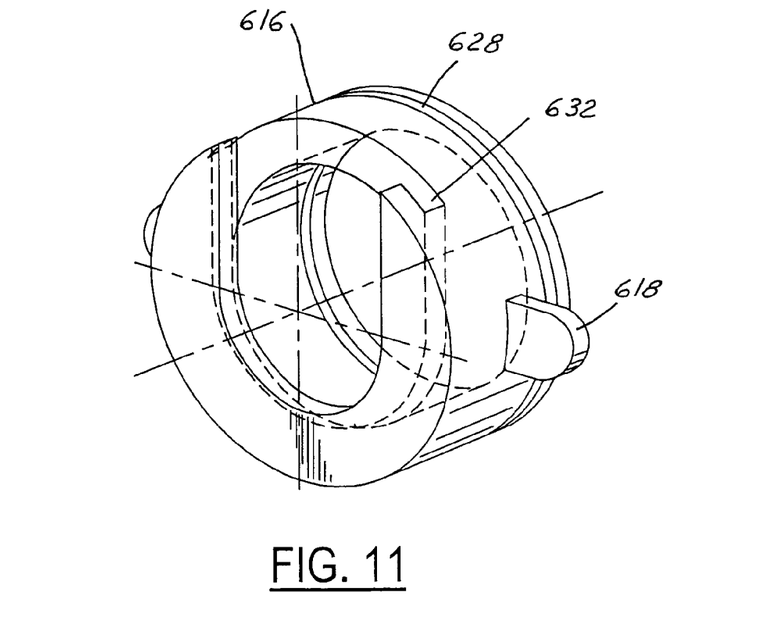
FIG. 11 is an enlarged perspective view of the piston shown in FIGS. 9 and 10.

Referring to FIG. 7, an interaxle differential arrangement 507 is provided. The interaxle differential arrangement 507 has components generally similar to those described in arrangements 307 and 407. Bevel springs 510 are juxtaposed between a side gear 512 and a clutch gear 514 to bias the clutch gear 514 in a more forward position. A piston 516 is provided having an imbedded pin 518. The imbedded pin 518 travels in a longitudinal slot 520 provided in the casing. The combination of pin 518 and slot 520 provide a pin and slot combination preventing the piston 516 from rotation.

Referring to FIGS. 8–11, an interaxle differential arrangement 607 is provided. The interaxle differential 607 has a helical side gear 610 in a sliding clutch gear 612. The sliding clutch gear has an annual groove 614. Interlocked with the sliding clutch gear 612 is a radially slotted piston 616. The piston 616 has two radially projecting ears 618 to allow it to be contacted by a spring 620. The spring 620 is captured between the piston ear 618 and an annular washer 622 which is held in position by a retaining ring 624. The piston 616 has an outer sealing ring 628 and an inter sealing ring 630, having ring seals inserted therein. The piston 616 also has a radial slot 632 which is enclosed by a flange 634. The flange portion 634 is interlocked within the groove 614 of the piston. This allows the piston 616 and the sliding clutch gear 612 to be pushed back by the spring 620 as if they were one common member. The casing 640 has a pocket (not shown) for nesting the ears 618 to prevent the piston 616 from rotating.

Figure 12:
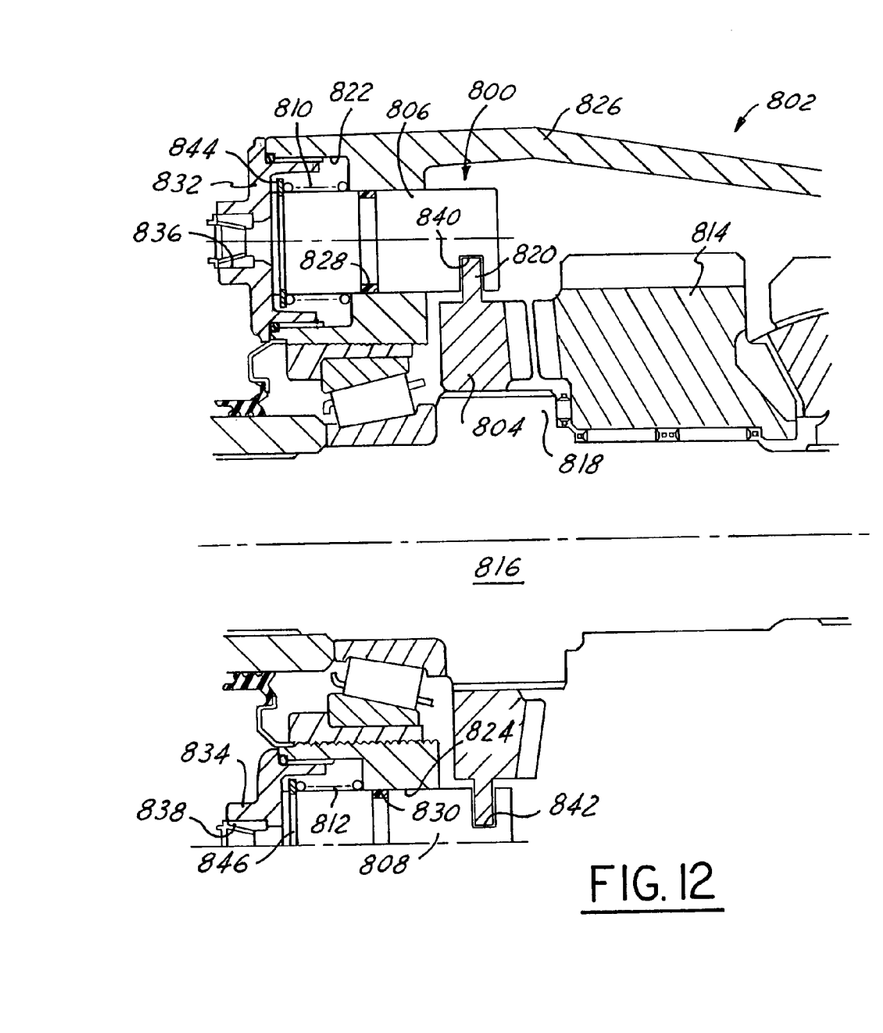
FIG. 12 is a cross-sectional view of a portion of a forward axle assembly of an inter-axle differential showing a clutch of the inter-axle differential in accordance with yet another embodiment of the present invention.
Figure 13:
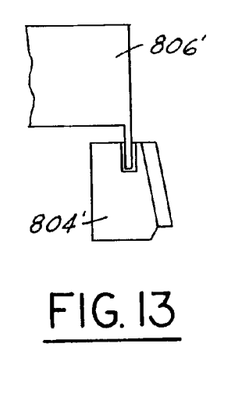
FIG. 13 is a perspective view of several components of the clutch of FIG. 12.

Referring now to FIGS. 12–13, a clutch 800 for an inter-axle differential 802 in accordance with another embodiment of the present invention is shown. Clutch 800 may include a clutch member 804, pistons 806, 808 and springs 810, 812.

Clutch member 804 is provided for selective engagement with differential side gear 814 to lock inter-axle differential 802. Clutch member 804 is disposed about input shaft 816 and the axis of rotation of input shaft 816 and is sized to be received on a radial flange 818 formed on input shaft 816. Clutch member 804 has a set of teeth on one side that may selectively engage corresponding teeth on side gear 814. Clutch member 804 also defines a radially outwardly extending flange 820 intermediate the axial ends of member 804 for a purpose described hereinbelow.

Figure 14:
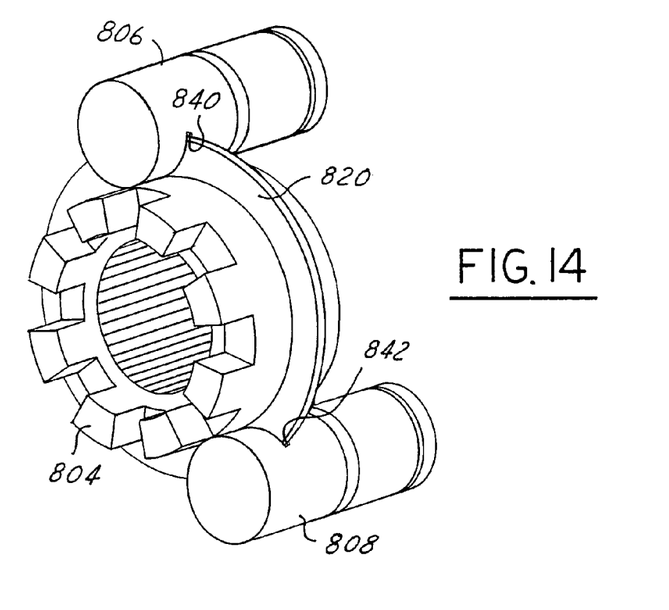
FIG. 14 is a cross-sectional view of a portion of several components of an alternative embodiment of the clutch of FIG. 12.

Pistons 806, 808 are provided to selectively urge member 804 into engagement with side gear 814. Pistons 806, 808 may be made from metals and metal alloys such as steel and heat treated for improved wear characteristics or may be made from powdered metal allowing for improved wear characteristics and easier manufacturing of the wear surfaces. Pistons 806, 808 are disposed within, and extend from, bores 822, 824 formed in drive axle housing 826. Bores 822, 824 are stepped diameter bores and seals 828, 830 may be disposed about grooves formed in pistons 808, 808 within a reduced diameter portion of bores 822, 824. The larger diameter portions of bores 822, 824 are closed by endcaps 832, 834 that define inlets 836, 838 in selective fluid communication with a fluid source. Inlets 836, 838 may be in fluid communication with the same fluid source. Fluid from the fluid source urges pistons 806, 808 in a first axial direction (to the right in FIG. 12) to urge clutch member 804 into engagement with gear 814. Pistons 806, 808 may be generally circular in construction (as best shown in FIG. 13) although it should be understood that pistons 806, 808 may assume other configurations. Pistons 806, 808 each include a semicircular notch 840, 842 proximate a rearward axle end of pistons 806, 808. Notches 840, 842 are configured to receive flange 820 of clutch member 804 and prevent relative rotation of pistons 806, 808 within bores 822, 824 and relative to member 804. In an alternate embodiment shown in FIG. 14, member 804' may define a pair of semicircular notches and each piston 806' (only one of which is shown in FIG. 14) may define radially inwardly extending flanges that are received by the notches in member 804'. Pistons 806, 808 are therefore aligned with clutch member 804 along axes extending parallel to the axis of rotation of input shaft 816. Pistons 806, 808 may also define radially outwardly extending flanges 844, 846, respectively, proximate forward axial ends of pistons 806, 808 which act as spring seats for springs 810, 812.

Springs 810, 812 are provided to bias pistons 806, 808 in a second axial direction (to the left in FIG. 12) to disengage member 804 from gear 814. Springs 810, 812 may be disposed between shoulders formed in stepped diameter bores 822, 824 and flanges 844, 846 on pistons 806, 808.

Pistons 806, 808 and springs 810, 812 are preferably diametrically opposite from one another. In this manner, a symmetric load is applied to clutch member 804 during locking of the clutch 800.

Figure 15:
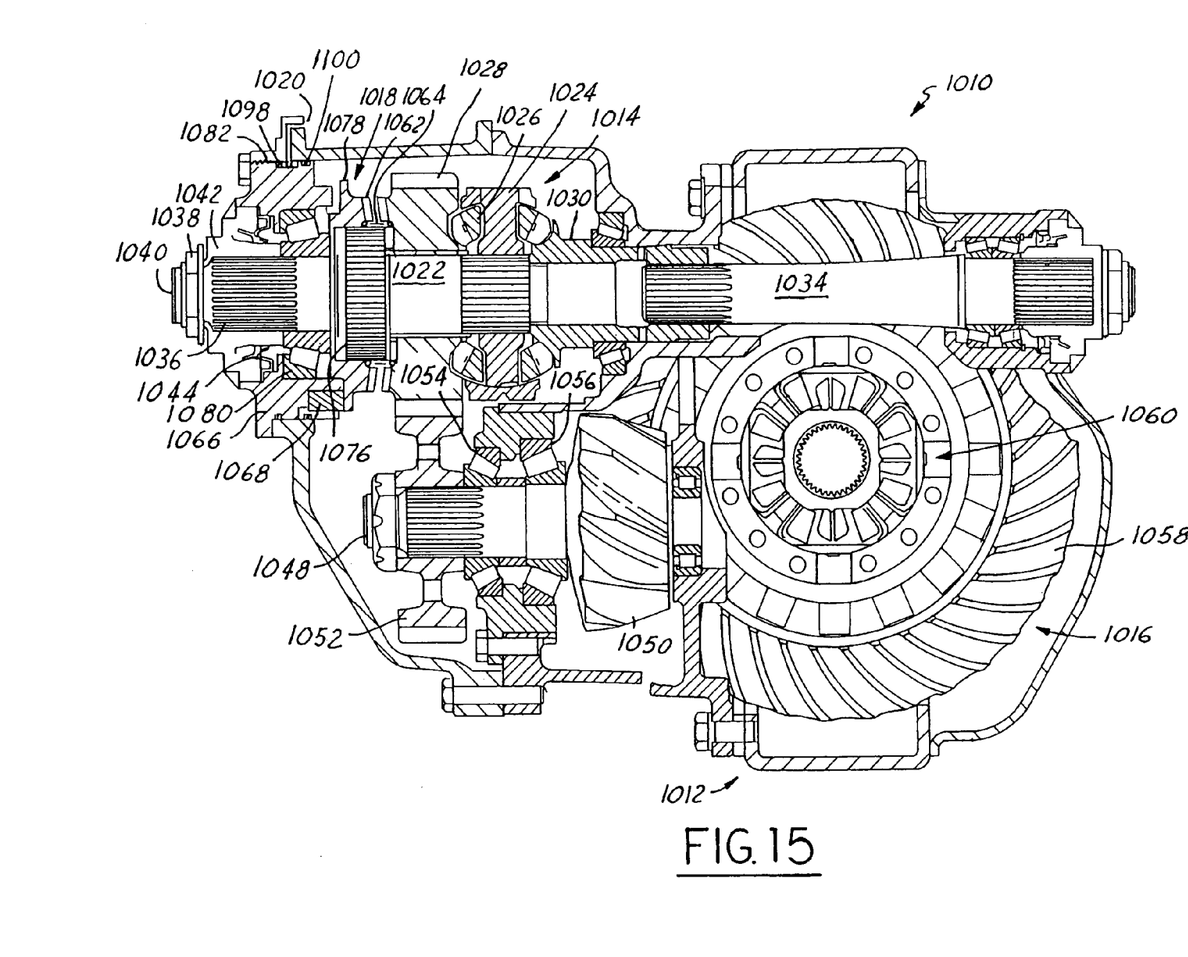
FIG. 15 is a cross-sectional view of a forward axle assembly of a tandem axle assembly including a clutch in accordance with yet another embodiment of the present invention.

Referring now to FIG. 15, a cross-sectional view of a forward axle assembly 1010 of a tandem axle assembly (not shown) is illustrated. Forward axle assembly 1010 is provided to drive wheels (not shown) supported on either side of assembly 1010 on axle half shafts (not shown) extending from axle assembly 1010. Forward axle assembly 1010 may include a housing 1012, an inter-axle differential 1014 for dividing power between a rear axle assembly (not shown) and the forward axle assembly 1010, a wheel differential assembly 1016, and a clutch 1018 in accordance with another embodiment of the present invention that serves as the inter-axle differential locking device.

Housing 1012 provides structural support for the other components of assembly 1010. Housing 1012 also protects the other components of assembly 1010 from foreign objects and elements. Housing 1012 may be made from conventional metals and metal alloys such as steel and may include multiple members that are sized relative to components of assembly 1010 and coupled together using conventional fasteners. Housing 1012 includes an opening 1020 through which fluid pressure can pass in order to actuate parts of the clutch 1018 further described below.

Inter-axle differential 1014 is provided to divide power between the rear axle assembly (not shown) and the forward axle assembly 1010. Differential 1014 is illustrated in FIG. 2. Differential 1014 may include an input shaft 1022, a spider 1024, differential pinion gears 1026, side gears 1028, 1030, and an output shaft 1034.

Input shaft 1022 is provided to transmit power from a power input shaft (not shown) at the forward end of forward axle assembly 1010 to spider 1024 and differential gears 1026 and is conventional in the art. Input shaft 1022 is driven by the power input shaft through a conventional input yoke (not shown). The input yoke may be splined to the forward end of input shaft 1022 on splines 1036 and may be retained thereon by a nut 1038 and a washer which are disposed about a threaded stud 1040 that extends from the forward end of shaft 1022 and is integral therewith. A dust cap 1042 and a seal 1044 are disposed about the input yoke (not shown) and are received within an opening in housing 1012.

Spider 1024 provides a mounting arrangement for differential pinion gears 1026 and is conventional in the art. Spider 1024 is supported on input shaft 1022 and may be coupled to input shaft 1022 for rotation therewith using a spline connection or in other ways customary in the art. Alternatively, spider 1024 may be made integral with input shaft 1022.

Differential pinion gears 1026 are provided to drive and transfer torque from input shaft 1022 to gears 1028, 1030. Gears 1026 are conventional in the art and may be made from conventional metals and metal alloys. Gears 1026 are coupled to spider 1024 for rotation with spider 1024 and input shaft 1022. The teeth on gears 1026 engage corresponding teeth on gears 1028, 1030.

Gear 1028 transfers torque from differential pinion gears 1026 to wheel differential assembly 1016. Gear 1028 is conventional in the art and may be made from conventional metal and metal alloys. Gear 1028 is disposed about input shaft 1022 and is freely rotatable thereon, being journalled on the shaft by bushings (not shown). Gear 1028 includes a first set of teeth on a forward planar surface which form a first member of clutch 1018 and a second set of teeth disposed on a rear planar surface that mesh with the teeth of differential gears 1026. Gear 1028 further includes a third set of teeth disposed about the radial periphery of gear 1028 for engagement with a corresponding driven gear in the wheel differential assembly.

Output gear 1030 transfers torque from differential pinion gears 1026 to output shaft 1034. Gear 1030 is conventional in the art and may be made from conventional metal and metal alloys. Gear 1030 is disposed about output shaft 1034 near the forward end of shaft 1034 and may be coupled thereto by mating splines (not shown) on gear 1030 and shaft 1034. Alternatively gear 1030 may be integral with shaft 1034. Gear 1030 is journalled for rotation within housing 1012 by a tapered roller bearing 1046.

Output shaft 1034 is provided to transmit a portion of the power provided by input shaft 1022 to the intermediate drive shaft assembly (not shown). Shaft 1034 is coaxially disposed relative to input shaft 1022 and extends outwardly from gear 1030. Shaft 1034 rotates with gear 1030. Shaft 1034 extends through openings in housing 1012 and is journalled within one opening of housing 1012 by bearings (not shown).

Wheel differential assembly 1016 is provided to transfer torque from input shaft 1022 to vehicle wheels (not shown) and to allow the wheels to rotate at different speeds. Assembly 1016 is conventional in the art and may include a pinion shaft 1048, a pinion gear 1050, a driven gear 1052, bearing sets 1054, 1056, a ring gear 1058, and a conventional bevel gear set 1060.

Figure 16:
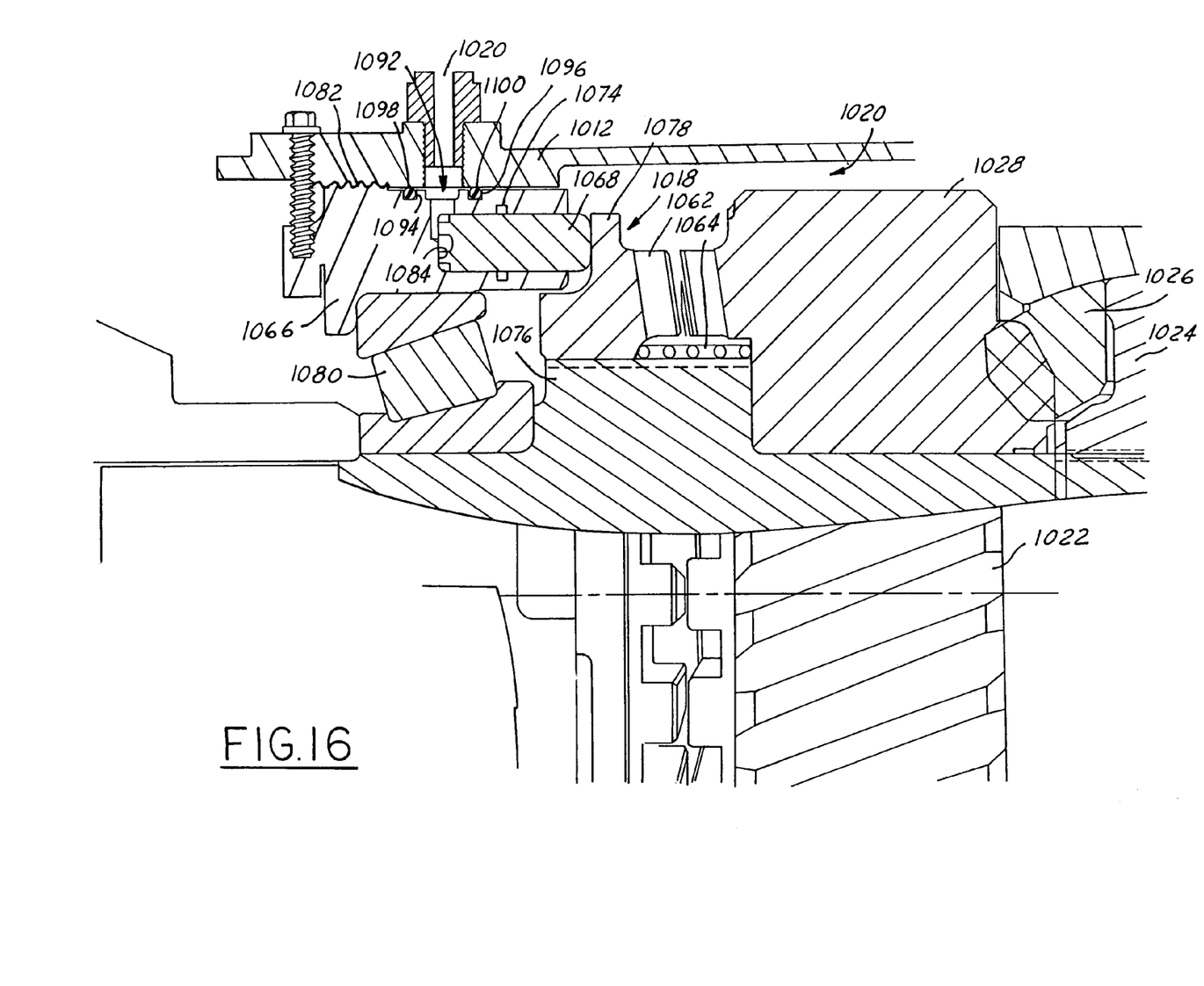
FIG. 16 is an enlarged, cross-sectional view of a portion of the forward axle assembly of FIG. 15 showing the clutch of the inter-axle differential.

Clutch 1018 is provided to selectively lock inter-axle differential 1014. The clutch can best be viewed in FIG. 16. FIG. 16 illustrates an enlarged, cross-sectional view of a portion of the forward axle assembly 1010 including inter-axle differential 1014. Clutch 1018 includes a clutch member 1062, means, such as spring 1064, for biasing member 1062 away from side gear 1028, a bearing adjuster or carrier 1066, and pistons 1068, 1070, 1072. Clutch 1018 may also include seals 1074 (a representative one of which is shown in FIG. 16) disposed about each piston 1068, 1070, 1072.

Clutch member 1062 is provided for selective engagement with side gear 1028 to lock inter-axle differential 1014. Clutch member 1062 is disposed about input shaft 1022 and is sized to be received on a radial flange 1076 formed on input shaft 1022. Clutch member 1062 has a set of teeth on one side that may selectively engage corresponding teeth on side gear 1028. An opposite side of clutch member 1062 may define a surface configured for engagement by pistons 1068, 1070, 1072. In the illustrated embodiment, member 1062 defines a radially extending flange 1078 intermediate the axial ends of member 1062 that defines this surface.

Spring 1064 provides a means for biasing clutch member 1062 away from side gear 1028. Spring 1064 is disposed between clutch member 1062 and side gear 1028. In the illustrated embodiment, spring 1064 is disposed about input shaft 1020 and is located radially inwardly of the mating teeth of member 1062 and side gear 1028. It should be understood, however, that spring 1064 could be located elsewhere.

Figure 17:
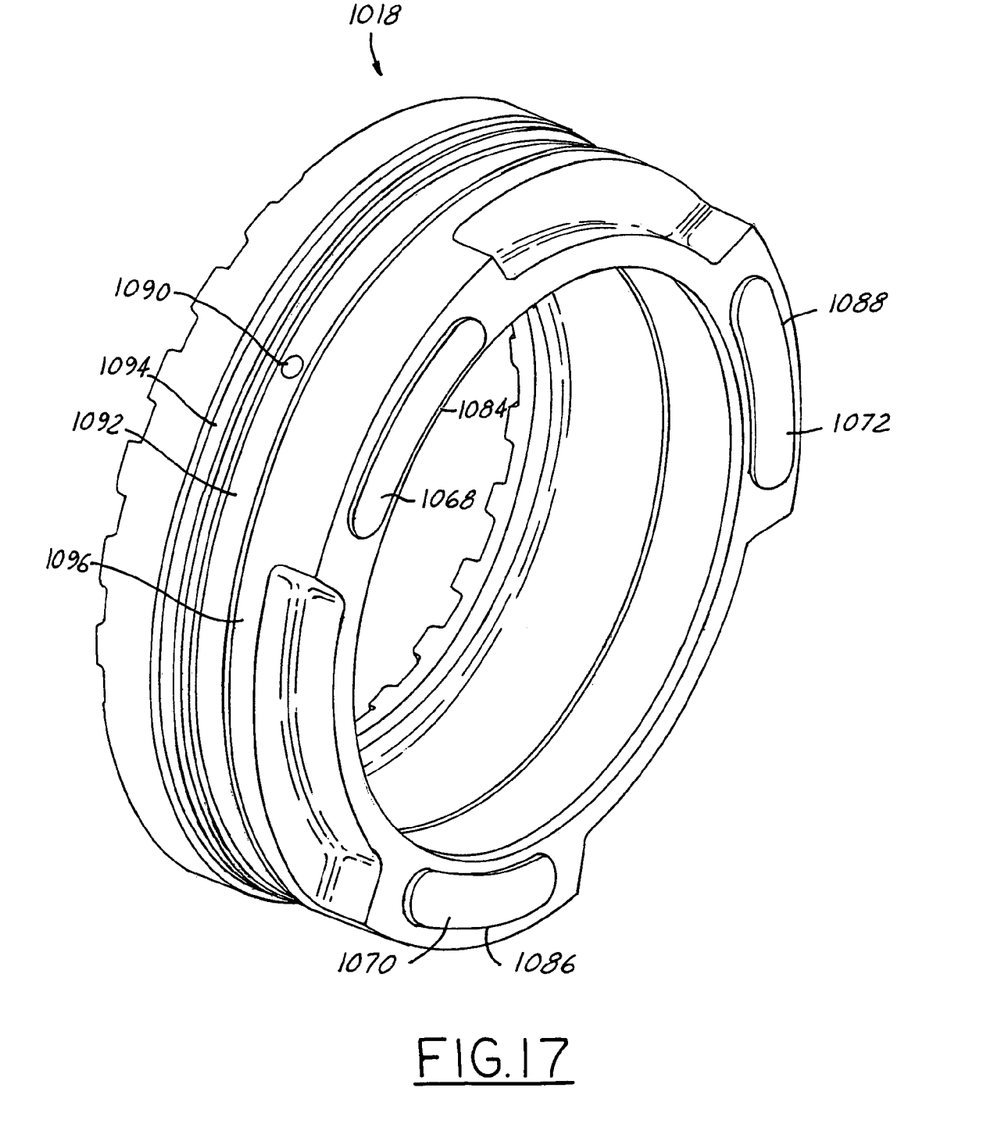
FIG. 17 is a perspective view of the carrier of the clutch of the inter-axle differential shown in FIG. 15.

Carrier 1066, which may also be referred to as a bearing adjuster, is provided to position and retain a bearing 1080 between housing 1012 and input shaft 1020 to allow for rotation of input shaft 1020 relative to housing 1012. Carrier 1066 defines a central bore configured to receive bearing 1080. Carrier 1066 also may define a plurality of threads 1082 on a radially outer surface configured to engage mating threads on a radially inner surface of housing 1012 to allow for positioning of carrier 1066 and bearing 1080 Carrier 1066 defines a plurality of chambers 1084, 1086, 1088 having openings on a rearward side of carrier 1066 and configured to receive pistons 1068, 1070, 1072 Although only three chambers 1084, 1086, 1088 and pistons 1068, 1070, 1072 are shown in the illustrated embodiment, it should be understood that the number of chambers and pistons may vary. Chambers 1084, 1086, 1088 may be equally spaced around the circumference of carrier 1066 and, in the illustrated embodiment, are of an arcuate shape when viewed from one axial end. It should be understood, however, that the shape of chambers 1084, 1086, 1088 may vary as required to house corresponding pistons 1068, 1070, 1072. Carrier 1066 further defines a plurality of bores 1090 in fluid communication with chambers 1084, 1086, 1088. Bores 1090 extend radially from chambers 1084, 1086, 1088 to a radial outer surface of carrier 1066. Carrier 1066, further defines a plurality of grooves 1092 1094, 1096, on a radially outer surface of carrier 1066. Grooves 1092, 1094, 1096 may extend circumferentially around at least a portion of carrier 1066 and may extend around the entire circumference of carrier 1066. Bores 1090 have an inlet formed in groove 1092 such that bores 1090 are in fluid communication with groove 1092. Groove 1092 is aligned with opening 1020 in housing 1012 and provides a path for fluid pressure to traverse the carrier 1066 and pass through bores 1090 to chambers 1084, 1086, 1088. Grooves 1094, 1096 are disposed on either side of groove 1092 and may also extend around the entire circumference of carrier 1066. Grooves 1094, 1096, are configured to receive seals 1098, 1100.

Pistons 1068, 1070, 1072 are provided to selectively urge member 1062 into engagement with side gear 1028. Pistons 1068, 1070, 1072 may be made from powdered metal allowing for improved wear characteristics and easier manufacturing of the wear surfaces. Pistons 1068, 1070, 1072 are housed within chambers 1084, 1086, 1088, respectively. Pistons 1068, 1070, 1072 preferably have a shape that prevents rotation within chambers 1084, 1086, 1088, respectively. In the illustrated embodiment, pistons 1068, 1070, 1072 are arcuate in shape when viewed from one axial end.

It should be understood, however, that the shape of pistons 1068, 1070, 1072 may vary without departing from the spirit of the present invention. Pistons 1068, 1070, 1072 may be circumferentially spaced within carrier 1066 and may be equally spaced around the circumference of carrier 1066. At least a portion of each piston 1068, 1070, 1072 is axially with a portion (such as flange 1078) of clutch member 1062 along axes extending parallel to the axis of rotation of input shaft 1022.

Seals 1074 are provided to prevent fluid from exiting chambers 1084, 1086, 1088. Seals 1074 may be made from rubber and are bonded onto pistons 1068, 1070, 1072 about the surface of pistons 1068, 1070, 1072.

In operation, spring 1064 normally biases clutch 1018 to a disengaged position. Engagement of clutch 1018 is accomplished by providing fluid pressure from a hydraulic or pneumatic fluid source through opening 1020 of housing 1012 to carrier 1066. Fluid pressure flows along groove 1092 and into bores 1090. The fluid pressure then enters chambers 1084, 1086, 1088 from bores 1090 whereby pistons 1068, 1070, 1072 are urged outward from chambers 1084, 1086, 1088 and into engagement with clutch member 1062, overcoming the force of spring 1064 and causing member 1062 to engage side gear 1028.

Figure 18:
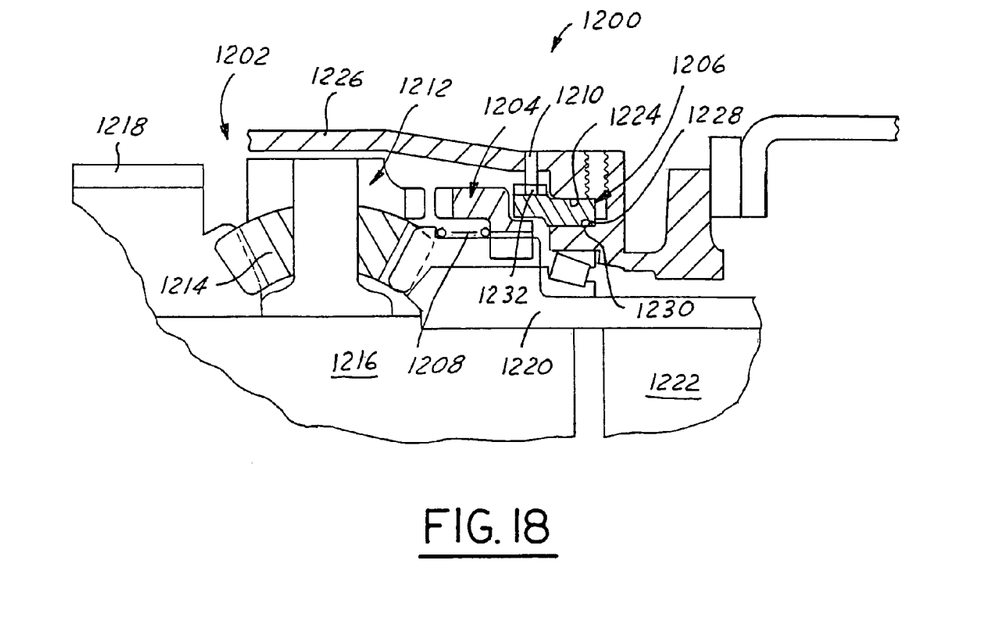
FIG. 18 is a cross-sectional view of a portion of a forward axle assembly of an inter-axle differential showing a clutch of the inter-axle differential in accordance with yet another embodiment of the present invention.

Referring now to FIG. 18, a clutch 1200 for an inter-axle differential 1202 in accordance with another embodiment of the present invention is shown. Clutch 1200 may include a clutch member 1204, a piston 1206, a spring 1208 and means, such as pin 1210, for preventing rotation of piston 1206.

Clutch member 1204 is provided for selective engagement with a differential case 1212. Case 1212 houses the plurality of differential gears 1214 of the inter-axle differential that are driven by input shaft 1216 and are in mesh with side gears 1218, 1220 through which power is transmitted to forward and rear axles. Clutch member 1204 may be coupled to output shaft 1222 and, in particular, may be supported on side gear 1220 which is coupled to shaft 1222 for rotation therewith. Member 1204 moves axially relative to side gear 1220 into and out of engagement with case 1212 and may be coupled to side gear through a spline connection.

Piston 1206 provided to selectively urge member 1204 into engagement with case 1212. Pistons 1206 may be made from metals and metal alloys such as steel and heat treated for improved wear characteristics or may be made from powdered metal allowing for improved wear characteristics and easier manufacturing of the wear surfaces. Piston 1206 is disposed within, and extends from, a chamber 1224 formed in a drive axle housing 1226 for the inter-axle differential. Piston 1206 may include one or more grooves 1228 configured to receive seals 1230 to prevent fluid leakage from chamber 1224. In the illustrated embodiment, chamber 1224 includes an axial portion that receives piston 1206 and a radial portion in fluid communication with the axial portion. The radial portion may be threaded to receive a coupling through which fluid may be introduced to chamber 1224 from a fluid source (not shown). Fluid from the fluid source urges piston 1206 in a first axial direction (to the left in FIG. 18) to urge clutch member 1204 into engagement with case 1212. In accordance with the present invention, piston 1206 is aligned with clutch member 1204 along an axis extending parallel to the axis of rotation of output shaft 1222 (as well as side gear 1220 and input shaft 1216 in the illustrated embodiment. Piston 1206 may further include a recess 1232 proximate a forward end of piston 1206 for a purpose described hereinbelow. Although only one piston 1206 is shown in the illustrated embodiment, it should be understood that multiple pistons may be employed (and housed in corresponding chambers 1224 within housing 1226) in a manner similar to embodiments described hereinabove. In this instance, the chambers 1224 would preferably, although not necessarily, be in fluid communication with one another and a single fluid source.

Spring 1208 is provided to bias piston 1206 in a second axial direction (to the right in FIG. 18) to disengage member 1204 from gear 1220. Spring 1208 may be disposed between shoulders formed in clutch member 1204 and side gear 1220. Spring 1208 may be a coil, wave or bevel spring as discussed hereinabove in connection with other embodiments. It should further be understood that multiple springs 1208 could be employed.

Pin 1210 is provided to prevent rotation of piston 1206. Pin is supported within and secured within a bore in housing 1226 and extends radially inwardly from housing 1226. Pin 1210 is received within recess 1232 of piston 1206 to prevent rotation of piston in either rotational direction. It should be understood from the description hereinabove for other embodiments of the invention that pin 1210 could vary in construction and that a variety of other structures could be used to prevent rotation of piston 1206.

A clutch in accordance with the present invention has many advantages as compared to various conventional clutches. The inventive clutch aligns the actuator and the clutch member thereby reducing space and material requirements in the axle assembly housing. The inventive clutch also eliminates the need for a pushrod and shift fork thereby reducing tooling and production costs, as well as eliminating the issues associated with misalignment of the piston and pushrod, relative rotation of the shift fork and clutch member, and tipping of the shift fork.

While the invention has been particularly shown and described with reference to the preferred embodiments thereof, it is well known by those skilled in the art that various changes and modifications can be made in the invention without departing from the spirit and scope of the invention.

We claim:

1. A clutch for an inter-axle differential, comprising:
   a clutch member disposed about an input shaft, said clutch member configured to selectively engage a side gear driven by a plurality of differential gears;
   a spring biasing said clutch member away from said side gear;
   a carrier disposed within a housing of said inter-axle differential and supporting a bearing disposed between said carrier and said input shaft; and,
   a piston disposed within a chamber in said carrier, said piston configured for selective engagement with said clutch member to urge said clutch member into engagement with said side gear
   wherein said clutch member comprises a clutch gear having a plurality of teeth configured for engagement with a corresponding plurality of teeth of said side gear.

2. The clutch of claim 1 wherein said spring is disposed between said clutch member and said side gear.

3. The clutch of claim 1 wherein said piston has a shape that prevents rotation within said chamber.

4. The clutch of claim 1 wherein said piston is made from a powdered metal.

5. The clutch of claim 1 further comprising a seal bonded to said piston.

6. A clutch for an inter-axle differential, comprising:
a clutch member disposed about an input shaft, said clutch member configured to selectively engage a side gear driven by a plurality of differential gears;
a spring biasing said clutch member away from said side gear;
a carrier disposed within a housing of said inter-axle differential and supporting a bearing disposed between said carrier and said input shaft; and,
a piston disposed within a chamber in said carrier, said piston configured for selective engagement with said clutch member to urge said clutch member into engagement with said side gear
wherein said carrier defines a groove on a radially outer surface and a bore in fluid communication with said groove and said chamber.

7. The clutch of claim 6 wherein said groove extends circumferentially around at least a portion of said carrier.

8. The clutch of claim 6 wherein said bore extends radially between said chamber and said groove.

9. A clutch for an inter-axle differential, comprising:
a clutch member disposed about an input shaft, said clutch member configured to selectively engage a side gear driven by a plurality of differential gears;
a spring biasing said clutch member away from said side gear;
a carrier disposed within a housing of said inter-axle differential and supporting a bearing disposed between said carrier and said input shaft; and,
a plurality of pistons disposed within a corresponding plurality of chambers in said carrier, said pistons configured for selective engagement with said clutch member to urge said clutch member into engagement with said side gear.

10. The clutch of claim 9 wherein said spring is disposed between said clutch member and said side gear.

11. The clutch of claim 9 wherein said pistons are made from a powdered metal.

12. The clutch of claim 9 further comprising a plurality of seals bonded to said pistons.

13. The clutch of claim 9 wherein said pistons are circumferentially spaced within said carrier.

14. The clutch of claim 9 wherein said pistons have a shape that prevent rotation within said chambers.

15. The clutch of claim 9 wherein said carrier defines a groove on a radially outer surface and a bore in fluid communication with said groove and one of said chambers.

16. The clutch of claim 15 wherein said groove extends circumferentially around at least a portion of said carrier.

17. The clutch of claim 15 wherein said bore extends radially between said one chamber and said groove.

18. A clutch for an inter-axle differential, comprising:
a clutch member disposed about an input shaft, said clutch member configured to selectively engage a side gear driven by a plurality of differential gears;
means for biasing said clutch member away from said side gear;
a carrier disposed within a housing of said inter-axle differential and supporting a bearing disposed between said carrier and said input shaft; and,
a piston disposed within a chamber in said carrier, said piston configured for selective engagement with said clutch member to urge said clutch member into engagement with said side gear
wherein said clutch member comprises a clutch gear having a plurality of teeth configured for engagement with a corresponding plurality of teeth of said side gear.

19. The clutch of claim 18 wherein said piston is made from a powdered metal.

20. A clutch member disposed about an input shaft, said clutch member configured to selectively engage a side gear driven by a plurality of differential gears;
means for biasing said clutch member away from said side gear;
a carrier disposed within a housing of said inter-axle differential and supporting a bearing disposed between said carrier and said input shaft; and,
a piston disposed within a chamber in said carrier, said piston configured for selective engagement with said clutch member to urge said clutch member into engagement with said side gear
wherein said carrier defines a groove on a radially outer surface and a bore in fluid communication with said groove and said chamber.

* * * * *